United States Patent [19]
Revol

[11] Patent Number: 5,965,633
[45] Date of Patent: Oct. 12, 1999

[54] PRINTING INKS

[75] Inventor: Michel Paul Gilles Revol, Bussy, France

[73] Assignees: S Coates Lorilleux S.A., Puteaux, France; Deluxe Corporation, Shoreview, Minn.

[21] Appl. No.: 08/945,900

[22] PCT Filed: May 3, 1996

[86] PCT No.: PCT/IB96/00479

§ 371 Date: Jan. 6, 1998

§ 102(e) Date: Jan. 6, 1998

[87] PCT Pub. No.: WO96/34923

PCT Pub. Date: Nov. 7, 1996

[30] Foreign Application Priority Data

May 4, 1995 [EP] European Pat. Off. ............. 95 470018

[51] Int. Cl.$^6$ ............................. C09D 11/06; C09D 11/08
[52] U.S. Cl. .................... 523/160; 106/31.6; 106/31.73; 525/390; 525/391
[58] Field of Search .................................. 523/160, 161; 106/31.6, 31.73; 525/390, 391

[56] References Cited

U.S. PATENT DOCUMENTS

| | | | |
|---|---|---|---|
| 2,346,968 | 8/1944 | Jeuck et al. | 106/30 |
| 2,720,461 | 10/1955 | Voet | 106/30 |
| 3,017,374 | 1/1962 | Bernardi et al. | 260/18 |
| 4,252,699 | 2/1981 | Tsuchiya et al. | 260/19 UA |
| 4,304,601 | 12/1981 | Sharp | 106/29 |
| 4,357,164 | 11/1982 | Tsuji et al. | 106/29 |
| 4,398,016 | 8/1983 | Homma et al. | 528/158.5 |
| 4,639,492 | 1/1987 | Makhlouf . | |
| 5,030,283 | 7/1991 | Bender et al. | 106/228 |
| 5,178,672 | 1/1993 | Miller . | |
| 5,308,390 | 5/1994 | Pennaz | 106/20 R |
| 5,382,282 | 1/1995 | Pennaz | 106/20 R |
| 5,427,615 | 6/1995 | Jordan . | |
| 5,431,721 | 7/1995 | Pennaz et al. | 106/20 R |
| 5,552,467 | 9/1996 | Reiter et al. | 524/270 |

FOREIGN PATENT DOCUMENTS

| | | |
|---|---|---|
| 1367505 | 11/1964 | France . |
| 8601527 | 3/1986 | WIPO . |

OTHER PUBLICATIONS

Database WPI, Section Ch, Week 9250, Derwent Publications Ltd., London, Great Britain, AN 92–413926, XP002013925, and SU–A–1,708,821, Jan. 30, 1992.

*Primary Examiner*—Vasu Jagannathan
*Assistant Examiner*—Callie E. Shosho
*Attorney, Agent, or Firm*—Ostrolenk, Faber,Gerb & Soffen, LLP

[57] ABSTRACT

A lithographic printing ink contains a lithographic varnish containing an alkali soluble or dispersible binder material which is the reaction product of an acid functional hard resin with a fatty ester oil and/or an alkyd resin.

7 Claims, No Drawings

PRINTING INKS

BACKGROUND OF THE INVENTION

1. Field of the Invention

This invention is concerned with improvements in and relating to printing inks, especially printing inks for use in lithographic printing processes such as offset lithography.

2. Description of the Related Art

It is an essential requirement of inks for use in lithographic printing processes that they be oleophilic in character and, accordingly, in order to wash them from printing apparatus it has been considered necessary to use organic solvent systems as wash media. It has been proposed, e.g. in WO94/06873, to provide lithographic inks which can be washed from printing apparatus by the use of aqueous wash media, such inks containing at least one component containing free carboxylic acid groups so that the component can be rendered hydrophilic by complete or partial neutralization of the carboxylic acid groups, i.e. by using an alkaline aqueous wash medium. In the unneutralized form the component is sufficiently hydrophobic to make it suitable for use in a lithographic printing ink.

Typically, the carboxylic acid group-containing component used in the various lithographic inks particularly described in WO94/06873 is an alkyd resin having an acid value of 25 mgKOH/g or more and, in order to obtain washability, using an aqueous alkaline wash, for the ink as a whole, relatively large amounts of such alkyd resins have to be employed, with consequent restraints on flexibility of formulation often with a reduction in the potential printing properties of the resultant ink.

SUMMARY OF THE INVENTION

It has now been found, in accordance with the present invention, that the reaction products of relatively highly acid functional hard resins with vegetable oils or like aliphatic carboxylic acid ester oils and/or alkyd resins can serve as useful components of lithographic printing inks, capable of affording the ink with the ability to be washed from a printing press using an aqueous alkaline wash medium and also making it possible to formulate a wide range of inks having good overall printing properties.

DESCRIPTION OF THE PREFERRED EMBODIMENTS

In the following specification aliphatic carboxylic acid ester oils (including vegetable oils, marine oils and the like synthetic products) will simply be referred to as "fatty ester oils".

Accordingly, one embodiment of the present invention provides a lithographic printing ink containing an alkali-soluble or dispersible binder material which is the reaction product of an acid functional hard resin with a fatty ester oil and/or an alkyd resin, wherein the hard resin has an acid value of at least 50 mgKOH/g. The invention also provides a method of lithographic printing using such an ink.

As discussed in more detail below, printing inks in accordance with the invention will also contain other components, such as diluents, colourants, other resinous binder materials, drying agents etc. However, an essential component of the printing inks of the invention is the reaction product of an acid functional hard resin with a fatty ester oil and/or an alkyd resin.

Hard resins are well-known components of printing inks such as offset lithographic inks and are solid, fusible resins, typically having a melting point of 100° C. or higher (see, for example, "The Printing Ink Manual", Fifth Edition, R. H. Leach ed., Blueprint, 1993, at pages 369/370).

Suitable hard resins for use in the production of the acidic reaction product include rosin esters, phenolic modified rosin esters, rosin modified maleic resins, rosin modified fumaric resins, formophenolic resins, terpene phenolic resins, hydrocarbon resins, phenolic resins and rosin and maleic modified hydrocarbon resins. Such resins are described, for example, in "Printing Inks for Lithography", Owen D. J., SITA Technology, 1994, at pages 58–72; "A Manual for Resins for Surface Coatings", Vol. I, (Second Edition), Goldring and Hayward, SITA Technology 1994, at pages 93–105 and 109–113. In contrast to the hard resins used in conventional lithgraphic inks, the hard resins used in accordance with the invention must be highly acid functional and must have an acid value of at least 50 mgKOH/g. Preferably though, this acid value is from 100 to 300 mgKOH/g, especially 150 to 250 mgKOH/g. Suitable commercially available highly acid functional hard resins include K-1614 ex Lawter (acid value 190–205), Alsynol RC14 ex DSM (acid value 275–300), Filtrez 575 ex Akzo USA (acid value 210), Unirez 8100 ex Union Camp (acid value 105), Unirez 8200 ex Union Camp (acid value 190), Erkapol 209 ex Kraemer (acid value 172), Dertophenon 160 ex DRT (acid value 62) and Ennesin A100 ex Wolstenholme (acid value 109).

The other component from which the reaction product is derived comprises a fatty ester oil and/or an alkyd resin. The oil, which is preferably derived from one or more fatty acids containing at least 8 carbon atoms, e.g. $C_8$–$C_{22}$ acids, may be a drying, semi-drying or non-drying oil or chemically modified derivative thereof such as linseed oil, tung oil, oiticia oil, perilla oil, dehydrated castor oil, soya bean oil, safflower oil rapeseed oil, tall oil, tallow oil, marine oils (e.g. fish oil, fish liver oil or whale oil), and synthetic and semisynthetic oils which are esters of aliphatic acids (e.g. Cardura E). Of these, linseed oil, soya bean oil and rapeseed are generally most preferred, especially the former. The choice of oil will depend, inter alia, upon the intended end use of the ink, for example non-drying oils may be used in reaction products for use in cold set inks and soya bean oil is useful for reaction products for use in heat set inks. Oils are described, for example, in "Printing Inks for Lithography", cited above, at pages 45–58.

A wide variety of alkyd resins may be employed as starting materials for the reaction product. The alkyd resin is preferably a long oil resin, preferably being derived from at least 50% by weight, more preferably 60% to 90% by weight, of long chain carboxylic acids, especially fatty acids. Suitable fatty acids include saturated and unsaturated $C_8$–$C_{22}$ carboxylic acids such as oleic, ricinoleic, linolenic, linoleic, eleostearic, caprylic, capric, lauric, myristic, palmitic and palmitoleic acids; typically employed in the form of mixtures of fatty acids derived from natural or synthetic oils such as those discussed above. The fatty acid mixtures may be used in the form of their naturally occurring triglycerides. In addition to the fatty acid, the alkyd will also be derived from other usual components, namely one or more polyhydric alcohols, such as glycerol, pentaerythritol, trimethylol propane (TMP), trimethylolethane (TME), neopentyl glycol, ethylene glycol, diethylene glycol, di-trimethylolpropane (di-TMP), dipentaerythritol; propylene glycol and 1,3-butane-diol; and one or more polycarboxylic acids such as orthophthalic acid, isophthalic acid, terephthalic acid, trimellitic acid, pyromellitic acid, adipic acid, maleic acid, fumaric acid, benzoic acid, p-tertiary butyl benzoic acid, and abietic acid. Other types of alkyd include polyester modified acrylic and alkyd modified acrylic resins. The acidity of this alkyd resin is not of particular importance and thus the alkyd resin may suitably have an acid value from 0 to 100 mgKOH/g.

The reaction product is produced by reacting (cooking) the hard resin with the oil and/or alkyd at elevated temperature, generally above 200° C. but more preferably in the range 220–260° C., for sufficient time to effect reaction. Generally the time required will vary inversely with the temperature and thus, for example, reaction may be carried out for a period of 6 hours at 220° C. down to a period of only 1 hour at 250° C. The reactions occurring during cooking are complex, leading to a multiplicity of reaction products, but probably involve transesterification reactions which are well familiar to the printing ink chemist (see, e.g. "Printing Inks for Lithography" at page 84). The progress of the reaction may be monitored by observation of various parameters such as viscosity and tack (both of which vary with increasing degree of reaction) and heptane tolerance (which increases with increasing degree of reaction). A principal characteristic of the reaction product used in accordance with the invention is that it has a relative high acid value, e.g. 40 to 200 mgKOH/g, especially 40 to 70 mgKOH/g. It is noteworthy that when reacting a high acid value hard resin with a low acid value oil and/or alkyd resin (as in accordance with the present invention) a product having a relatively high acid value is obtained, that is acidity of the starting material is retained.

The weight ratio of the high acid value hard resin to oil and/or alkyd resin is suitably from 4:1 to 0.5:1, preferably 2:1 to 1:1, especially 1.5:1 to 1:1.

The reaction is most preferably carried out under an inert atmosphere, e.g. nitrogen, to inhibit potential oxidation of any oxidisable species, especially drying species in the oil and/or alkyd and/or hard resin.

In accordance with a further embodiment, the present invention encompasses a method for the production of a lithographic ink which includes the steps of reacting an acid functional hard resin (especially one having acid values as discussed above) with a fatty ester oil and/or alkyd resin at elevated temperature (preferably above 200° C., especially from 220° C. to 250° C.) for a time sufficient to cause reaction between the hard resin and the oil and/or alkyd (e.g 1 to 6 hours) whereby to provide an acid functional reaction product preferably having an acid value of from 40 to 200 mgKOH/g; and subsequently combining the said reaction product with a solution/diluent and a colorant to provide a lithographic printing ink.

It should be noted that the acid functional reaction products used in the inks of the invention, whilst being capable of affording alkali-washability to the inks, have unexpectedly been found to be good binders for use in lithographic printing inks. Accordingly, the invention is intended to encompass not only alkali washable inks but inks intended for washing with conventional organic solvent systems and containing the acid functional reaction product as a binder.

A second essential component of the inks of the invention is a solvent/diluent and it has been found that the acid functional reaction products noted above are well compatible with a wide variety of solvent/diluents including fatty acid esters as well as petroleum distillates and mineral oils. Examples of such fatty acid esters include the methyl, ethyl, butyl and 2-ethylhexyl esters of tall oil fatty acids, coconut fatty acids, linseed oil fatty acids, soya oil fatty acids, palm oil fatty acids and rapeseed oil fatty acids; diethylene glycol esters of tall oil fatty acid; methyl esters of lauric acid, myristic acid, palmitic acid and caprylic acid; methyl, butyl, 2-ethylhexyl and isobutyl esters of oleic acid; oleic acid esters of diethylene and triethylene glycol; and dibutyl and di-2-ethylhexyl adipates and sebacates. Accordingly, it is possible to formulate an ink in accordance with the invention entirely without mineral oil or petroleum distillate diluent and this may be an advantage when environmental and/or legal considerations place constraints on the use of mineral oils and/or petroleum distillates. It should, however, be noted that the reaction products are compatible with mineral oils and petroleum distillates so that these may be used as all or a part of the solvent/diluent system, if desired.

Commonly, in the production of an ink in accordance with the invention, at least a part of the solvent/diluent will be introduced by letting down (diluting) the reaction product after it has sufficiently cooled.

Together, the acid functional reaction product and solvent/diluent form the essential ingredients of the varnish component of an ink in accordance with the invention. Other resinous components may, and often will, be present in the varnish component to serve, for example, to adjust the overall rheology of the ink, its pigment wetting ability, hardness, flexibility, setting speed, gloss, tack, adhesion, etc. Typical such other resins include alkyd resins and, in order to achieve water-washability characteristics for the final ink, when desired, these additional alkyd resins desirably have an acid value of from 0 to 100 mgKOH/g, preferably 30 to 70 mgKOH/g. Furthermore, other hard resins may be present in the varnish and these need not have high acid values. Such other resins, such as alkyds or hard resins, may be introduced by directly compounding with the reaction product and solvent diluent or they may be formulated themselves as a varnish, i.e. in combination with solvent/diluent, and then that varnish blended with the varnish comprising acid functional reaction product and solvent/diluent. Such other varnish to be blended with the principal, acid functional reaction product-containing varnish may be produced as desired, for example by a so-called "cold cut" process or by hot dispersion dissolution at temperatures between 150 and 210° C. (see, e.g. "Printing Inks for Lithography" at page 84). Where the additional resin is a low acid value hard resin this may be introduced by incorporating it as an ingredient in the varnish before or after reaction. Where the final varnish is to be water-washable, it has been found that it should have an overall acid value of 30- 80 mgKOH/g, preferably 40–70 mgKOH/g.

The varnishes of the inks of the present invention suitably contain from 20 to 100% by weight, preferably 40 to 50% by weight, of acidic reaction product; from 0 to 25% by weight, preferably from 10 to 25% by weight, of other resinous binder components; and from 10 to 60% by weight, preferably from 10 to 30% by weight of solvent/diluent.

The third essential component of the inks of the invention comprises a colourant, which generally takes the form of a pigment. A wide variety of pigments are suitable for use in the printing inks of the invention and are discussed, for example, in "The Printing Ink Manual" Fourth Edition, Leach ed., Van Nostrand Rheinhold, at pages 110–171. Suitably, the weight ratio of varnish to pigment in an ink in accordance with the invention will be from 20:1 to 0.5:1, preferably 5:1 to 1:1. The varnish and pigment may be compounded by any desired appropriate manner, for example on a three-roll mill or bead mill; e.g. as described in "The Printing Ink Manual" cited above at pages 624–644.

In addition to the above components, inks in accordance with the invention may contain other ingredients, in particular drying agents when one or more components of the ink comprises or is derived from a drying or semi-drying oil. Suitable driers include primary driers such as organic salts (e.g. octoates, tallates and napthenates) of transition metals such as cobalt and manganese. These primary driers may be used in combination with one or more auxilliary driers such as organic salts of zinc and calcium. The use of drying agents in printing inks comprising or derived from drying oils is well established and is discussed, for example, in "The Printing Ink Manual", 2nd Edition, cited above, at pages 258–260.

Inks in accordance with the invention are intended for use in any lithographic printing process, including so-called "waterless" offset lithography. As noted above, the inks of the invention may be designed to be washable with dilute alkaline solutions, e.g. 0.05 to 0.2 molar solutions of alkalis such as sodium hydroxide or sodium carbonate. In addition to being potentially washable with aqueous media, the inks of the invention have various other advantageous properties. Thus, as noted above, they may be formulated without using mineral oils or petroleum distillates as solvent/diluent and, indeed, may be flexibly formulated for a wide range of printing applications and post-printing characteristics. Further, the final setting of an ink, after application to a substrate, is markedly assisted by the fact that any drying components, derived directly or indirectly from a drying vegetable oil, are chemically linked to the hard resin component. Furthermore, it has been found that inks in accordance with the invention may not require the presence, in the fountain solution, of an alcohol such as isopropyl alcohol.

In order that the invention may be well understood the following Examples are given by way of illustration only.

In the Examples viscosity was measured on a Laray viscometer at 23° C. at 50% R.H. Tack was evaluated by testing a 0.3 ml sample at 100 rpm on a Prufbau Inkomat at 23° C. and 50% R.H. Heptane tolerance refers to the minimum volume (ml) of n-heptane which when added to 10 g of varnish and 10 g of o-xylene causes precipitation at 23° C.

EXAMPLE 1

Preparation of Varnish I

A reaction product of an acid functional hard resin and a fatty ester oil.

27 Kg of heat treated linseed oil (Huile de Lin Stabilisee ROB ex Robbe) were charged into a reactor which was then flushed with nitrogen to maintain a nitrogen atmosphere therein. The linseed oil was heated to a temperature of 180–190° C. and 10 kg of a phenolic modified rosin ester hard resin having an acid value of <20 mgKOH/g (Albertol KP 351 ex Hoechst) were introduced into the reactor and the whole mixture stirred until the hard resin had become dispersed in the linseed oil (>20 minutes). The temperature of the dispersion was then raised to 200° C. and 34 kg of a maleic modified rosin ester hard resin having an acid value of 190–205 mgKOH/g (K 1614 ex Lawter) were added to the dispersion which was then heated to a temperature between 240 and 245° C. and maintained at that temperature for 1 hour and 30 minutes and then cooled to 190° C., after which 25 kg of coconut fatty acid methyl ester (Estisol 312 ex Esti Chem A/S) were added and the whole stirred for 10 minutes. A further 4 kg of the coconut fatty acid methyl ester (Estisol 312) were then added to the mixture which was then sampled for quality control tests and had a viscosity of 300 poise, a tack of 290, a heptane tolerance of 32 ml, and an acid value of 61 mgKOH/g (theoretical acid value 70 mgKOH/g). The resulting material was then filtered through a 50 micron filter to give Varnish I.

EXAMPLE 2

Preparation of Varnish II

A modification of Varnish I with alkyd to give a wetting varnish.

85 Kg of Varnish I and 5 kg of an alkyd resin having an acid value of about 40 mgKOH/g (Hydrokyd 9 ex Lawter) were charged to a reactor and were dispersed with heating to a temperature of 160° C. 6 Kg of a rosin modified phenolic resin having an acid value of 15–20 mgKOH/g (Krumbhaar K42404 ex Lawter) were added to the dispersion which was homogenised for 20 minutes. Then 4 kg of coconut fatty acid methyl ester (Estisol 312) were added to the homogenised mixture and the whole was then filtered through a 50 micron filter to give Varnish II, having a viscosity of 250 poise, a tack of 325, a heptane tolerance of 33 ml, and an acid value of 52 mg KOH/g (theoretical 55 mg KOH/g).

EXAMPLE 3

Preparation of Varnish III

A wetting varnish.

67 Kg of an alkyd resin having an acid value of about 40 mgKOH/g (Hydrokyd 9 ex Lawter) were added to a reactor and heated to 160° C. when 80 kg of a rosin modified maleic resin having an acid value of 275–300 mgKOH/g (Alsynol RC 14 ex DSM) were added to the heated mixture and the whole homogenised for 20 minutes after which 15 kg of coconut fatty acid methyl ester (Estisol 312) were added to the homogenised mixture which was then filtered through a 50 micron filter to give Varnish III having a viscosity of 165 poise, a tack of 385, a heptane tolerance of <100 ml, and an acid value of 80 mKOH/g (theoretical value 82 mgKOH/g).

EXAMPLE 4

Preparation of Anti-setoff Paste

15 Kg of amorphous silica (WR Grace - Syloid 162C ex W. R. Grace) were added, in three lots, to 40 Kg of Varnish I, with mixing, and the resultant paste further diluted with a further 45 kg of Varnish I.

EXAMPLE 5

Preparation of Yellow Ink

A mixture of 4 kg of a first yellow pigment (arylamide Yellow 156), a second yellow pigment (Jaune Diaryl GRE 2101) and 0.3 kg of a hydroquinone-containing antioxidant paste (HP 5025 ex SPCI) were mixed with into a mixture of 36 kg of Varnish II and 7 kg of Varnish III, and then ground on a three-roll mill. There were added to the resultant dispersion 17 kg of Varnish I, 12 kg of Varnish II, 3 kg of anti-setoff paste, 5 kg of a micronised wax dispersant (Poliwax 33), 1 kg of another micronised wax dispersion (PC 843), 1 kg of a litho additive (Optilith 4 - ex Lawter), 0.5 kg of another colourant (Iberian Orange concentrate) and the whole was then homogenised. 1 kg of mixed driers and 2.5 kg of a manganese drier (Soligen Manganese 6% LS 5X) were added to the homogenised mixture which was further mixed and finally 1.7 kg of coconut oil fatty acid methyl ester (Estisol 312) added thereto, to give a yellow ink having a viscosity of 365 poise and tack of 155.

EXAMPLE 6

Production of Black Ink

8 Kg of a blue pigment (Alkali Blue SR 1118), 4 kg of a black pigment (Printex Black 35), 14 kg of a black pigment (Printex Black 45) and 0.3 kg of antioxidant paste (HP 5025) were dispersed into a mixture of 33 kg of Varnish II and 13.5 kg of Varnish III in a three-roll mill. A mixture of 13.7 kg of Varnish I, 2.5 kg of anti-setoff paste, 4.4 kg of micronised wax (Poliwax 33), 1 kg of micronised wax (PC 843) and 1 kg of litho additive (Optilith 4) were mixed into the resulting dispersion followed by 1 kg of mixed driers and 3 kg of manganese drier (Soligen Managanese 6% LS5X). Finally 1 kg of coconut oil fatty acid methyl ester (Estisol 312) was incorporated in the mixture to give the black ink having a viscosity of 360 poise and a tack of 160.

EXAMPLE 7

Production of Cyan Ink

16 Kg of Cyan pigment (Cyanine Lutetia J500) and 0.3 kg of antioxidant paste (HP 5025) were dispersed, on a three roll mill, into a mixture of 37 kg of Varnish II and 12 kg of Varnish III. There were then mixed into the dispersion 19 kg of Varnish I, 3 kg of anti-setoff paste, 4 kg of micronised wax (Poliwax 33), 1 kg of micronised wax (PC 843) and 1 kg of litho additive (Optilith 4). There were then added 1 kg of mixed driers and 2.5 kg of the manganese drier (Soligen Manganese 6% LS5X) followed by 3.2 kg of coconut fatty acid methyl ester (Estisol 312) to give the Cyan ink, having a viscosity of 350 poise and a tack of 180.

EXAMPLE 8

Production of Magenta Ink

18 Kg of pigment (Rubis Lithol D 4568 DD) and 0.3 kg of antioxidant paste were dispersed, on a three roll mill, into a mixture of 34 kg of Varnish II and 15 kg of Varnish III. There were mixed into the dispersion 18.2 kg of Varnish I, 3 kg of anti-setoff paste, 5 kg of micronised wax (Poliwax 33), 1 kg of micronised wax (PC 843) and 1 kg of litho additive (Optilith 4). There were then introduced into the mixture I kg of mixed driers and 2.5 kg of manganese drier (Soligen Manganese 6% LS5X), followed by 2 kg of coconut fatty acid methyl ester (Estisol 312) to give a magenta ink having a viscosity of 350 poise and a tack of 155.

EXAMPLE 9

The inks of examples 5 to 8 were printed on Maine Club 115 gm stock using a 4 colour Heidelberg MO press fitted with OCS 72 blankets and an Alcolor damping unit. The fountain solution was Vegra Blue 3300 which contained 10% isopropyl alcohol and had a pH of 5.0. The press was run at speeds of up to 8000 impressions an hour, and at least 3000 sheets were printed. Offset behaviour on the press, lithographic performance, setting time and print quality were all good. After printing, the rollers and blankets were readily cleaned using a water-based wash-up solution (B-546 from Deluxe) of pH 10. The plates were readily cleaned using a water-based wash-up solution (8-590 from Deluxe).

EXAMPLE 10

A similar test to that described in Example 9 was conducted, except that the fount solution was water containing 3% Hydralcool (ex CSFI), i.e. alcohol free, and had a pH of 4.53. Offset behaviour on the press, lithographic performance, setting time and print quality were all good. After printing, the rollers and blankets were readily cleaned using a water-based wash-up solution (B-546 from Deluxe) of pH 10.

Varnishes IV to VI show a range of formulating options. An acid functional hard resin can be reacted solely with an alkyd (Varnish IV), with an alkyd and a fatty ester oil (Varnish V), or solely with a fatty ester oil (Varnish VI) to give alkali-soluble or dispersible binders which form the basis for water washable lithographic inks.

EXAMPLE 11

Varnish IV

A reaction product of an acid functional hard resin and an alkyd.

20g of a long oil linseed alkyd having an acid value of 12mg KOH/g maximum (Surkyd 119 ex Mitchanol) and 10 g of a tall oil fatty acid ester having an acid value of 2 mg KOH/g (Nirez 9012 ex Arizona) were charged to a reactor. The reactor was then flushed with nitrogen to maintain a nitrogen atmosphere therein, and the reaction mixture heated to 160–170° C. There were then added 32 g of a rosin modified fumaric hard resin having an acid value of 210 mg KOH/g (Filtrez 575 ex Akzo Nobel), and 8 g of a hard resin having an acid value of <20 mg KOH/g (XR 1769 ex Lawter). The reaction mixture was heated to 230° C. and maintained at this temperature for 30 minutes. A further 30 g of Nirez 9012 were added for purposes of viscosity adjustment to give a clear varnish with the following characteristics:

Viscosity - 370 poise

Tack - 424–410

Acid value - 64.5 mg KOH/g (theoretical acid value 69.8 mg KOH/g).

The resulting mixture was filtered through a 50 micron filter to give Varnish IV.

EXAMPLE 12

Varnish V

A reaction product of an acid functional hard resin, a fatty ester oil and an alkyd.

450 g of heat treated linseed oil (Huile de Lin Stabilisée ROB ex Robbe) and 150 g of a long oil linseed alkyd (Printorob I 84ST ex Robbe) were charged to a reactor which was then flushed with nitrogen to maintain a nitrogen atmosphere therein. The linseed oil was heated to a temperature of 180 to 200° C. before adding 600 g of a maleic modified rosin ester hard resin having an acid value of 190–205 mg KOH/g (Krumbhaar K1614 ex Lawter). The reactants were heated at 230° C. for one hour, and then at 240° C. for a further 2 hours and 30 minutes. After cooling to 180° C. 300 g of coconut fatty acid methyl ester (Estisol 312 ex Esti Chem A/S) were stirred in. Samples taken after 24 hours showed the following characteristics:

Viscosity - 480 poise

Tack - 310

Heptane tolerance - 70ml

Acid value of 62 mg KOH/g (theoretical acid value 78 mg KOH/g).

The resulting mixture was filtered through a 50 micron filter to give Varnish V.

EXAMPLE 13

Varnish VI

A reaction product of an acid functional hard resin and a fatty ester oil.

40 g of heat treated linseed oil (Huile de Lin Stabilisée ROB ex Robbe) were charged into a reactor which was then flushed with nitrogen to maintain a nitrogen atmosphere therein. The linseed oil was heated to a temperature of 180–200° C. before adding 40 g of a maleic modified rosin ester hard resin having an acid value of 190–205 mg KOH/g (Krumbhaar K1614 ex Lawter). The reaction mixture was then heated to 250° C. and maintained at this temperature for 1 hr 30 min before cooling to 110° C. and adding 10 g of tall oil fatty acid ester having an acid value of 2 mg KOH/g (Nirez 9012 ex Arizona) and 1.8 g of an gelling agent in mineral oil (40% by weight of Additol VXL 12 ex Hoechst in Scriptane 280 ex Haltermann). The mixture was re-heated to 180° C., maintained at this temperature for 10 minutes, and then a further 7.0 g of Nirez 9012 added to give a clear varnish with the following characteristics:

Viscosity - 240 poise

Tack- 265

Heptane tolerance - 50 ml

Acid value of 68 mg KOH/g (theoretical acid value 78 mg KOH/g).

The resulting mixture was filtered through a 50 micron filter to give Varnish VI.

Varnishes VII and VIII illustrate the use of acid functional hard resins with differing acid values.

EXAMPLE 14

Varnish VII

A reaction product of an acid functional hard resin and a fatty ester oil, with one hard resin having an acid value of 53 mg KOH/g, and a second hard resin having an acid value of 157 mg KOH/g.

27 g of heat treated linseed oil (Huile de Lin Stabilisée ROB ex Robbe) were charged into a reactor which was then flushed with nitrogen to maintain a nitrogen atmosphere therein. The linseed oil was heated to a temperature of 190° C. before adding 25 g of a rosin modified phenolic hard resin having an acid value of 53 mg KOH/g (Krumbhaar K4664 ex Lawter) and 20 g of a modified rosin hard resin having an acid value of 157 kg KOH/g (Grafofen 3412 ex Cremona). The mixture was then heated at 240° C. for 45 minutes and 25 g of coconut fatty acid methyl ester (Estisol 312 ex Esti Chem A/S) stirred in. Samples were taken and showed the following characteristics:

Viscosity - 210 poise

Tack- 300

Heptane tolerance - 50 ml

Acid value - 47 mg KOH/g (theoretical acid value 47 mg KOH/g).

The resulting mixture was filtered through a 50 micron filter to give Varnish VII.

EXAMPLE 15

Varnish VIII

A reaction product of an acid functional hard resin and an alkyd, with the hard resin having an acid value of 286 mg KOH/g.

20 g of a long oil linseed alkyd having an acid value of 12 mg KOH/g maximum (Surkyd 119 ex Mitchanol) and 10 g of a tall oil fatty acid ester having an acid value of 2 mg KOH/g (Nirez 9012 ex Arizona) were charged to a reactor. The reactor was then flushed with nitrogen to maintain a nitrogen atmosphere therein, and the reaction mixture heated to 160–170° C. There were then added 20 g of a rosin modified maleic resin having an acid value of 275–300 mg KOH/g (Alsynol RC 14 ex DSM), and 22 g of a rosin modified phenolic resin having an acid value of <10 mg KOH/g (Alsynol RL58 ex DSM). The reaction mixture was heated to 230° C. and maintained at this temperature for 30 minutes, when samples were taken showing the following characteristics:

Viscosity - 360 poise

Tack- 425–410

Acid value - 61.7 mg KOH/g (theoretical acid value 60 mg KOH/g).

A final viscosity adjustment was made by stirring in 29 g of a tall oil fatty acid ester having an acid value of 2 mg KOH/g (Nirez 9012 ex Arizona). The resulting mixture was filtered through a 50 micron filter to give Varnish VIII.

Varnishes IX and X show how it is possible to formulate with a wide range of compositions. Varnish IX has a ratio of hard resin to oil of 4:1, while Varnish XI has a ratio of hard resin to oil of 0.65:1.

EXAMPLE 16

Varnish IX

Ratio of hard resin to oil of 4:1.

250 g of heat treated linseed oil (Huile de Lin Stabilisée ROB ex Robbe) were charged into a reactor which was then flushed with nitrogen to maintain a nitrogen atmosphere therein. The linseed oil was heated to a temperature of 180–200° C. before adding 750 g of a rosin modified phenolic hard resin having an acid value of 135 mg KOH/g (Jonrez RP 305 ex Westvaco Chemicals) and 250 g of a maleic modifed rosin ester hard resin having an acid value of 190–205 mg KOH/g (Krumbhaar K1614). The mixture was then heated with stirring at 230° C. for 2 hours 15 minutes when a heptane tolerance of 63 ml was reached. A final viscosity adjustment was made by stirring in 425 g of coconut fatty acid methyl ester (Estisol 312 ex Esti Chem A/S). Samples take after 24 hours showed the following characteristics:

Viscosity - 421 poise

Tack - 500–480

Heptane tolerance - 63 ml

Acid value - 95 mg KOH/g (theoretical acid value 90 mg KOH/g).

The resulting mixture was filtered through a 50 micron filter to give Varnish IX.

EXAMPLE 17

Varnish X

Ratio of hard resin to oil of 0.65:1.

600 g of heat treated linseed oil (Huile de Lin Stabilisée ROB ex Robbe) were charged into a reactor which was then flushed with nitrogen to maintain a nitrogen atmosphere therein. The linseed oil was heated to a temperature of 180–200° C. before adding 150 g of a fumaric resin having an acid value of 250 mg KOH/g (Valke AF12 ex Forchem OY) and 150 g of a maleic resin having an acid value of 25 mg KOH/g (TPValkeres 5715 ex Forchem OY. The mixture was then heated at 230° C. for one hour, whereupon a further 90 g of TPValkeres 5715 were added to adjust viscosity. After a further one hour, samples were taken which showed the following characteristics:

Viscosity - 54 poise

Tack - 187

Heptane tolerance - 80 ml

Acid value - 39 mg KOH/g (theoretical acid value 44 mg KOH/g).

The resulting mixture was filtered through a 50 micron filter to give Varnish X.

EXAMPLE 18

Varnish XI

Includes petroleum distillate.

160 g of heat treated linseed oil (Huile de Lin Stabilisée ROB ex Robbe) and 150 g of a long oil linseed alkyd (Printorob I 84ST ex Robbe) were charged into a reactor which was then flushed with nitrogen to maintain a nitrogen atmosphere therein. These were heated to a temperature of 180 to 200° C. before adding 300 g of a maleic modified rosin ester hard resin having an acid value of 190–205 mg KOH/g (Krumbhaar K1614 ex Lawter) and 450 g of a rosin modified phenolic resin having an acid value of 135 mg KOH/g. The reactants were heated at 230° C. for three hours, when samples showed the following characteristics:

Viscosity - 424 poise

Tack - 503

Heptane tolerance - 56 ml

Acid value - 78 mg KOH/g (theoretical acid value 81 mg KOH/g).

Then 420 g of a petroleum distillate (Scriptane 260 ex Haltermann) were added. The resulting mixture was filtered through a 50 micron filter to give Varnish XL.

EXAMPLE 19

Varnish XII

Suitable for use in waterless litho.

600 g of heat treated linseed oil (Huile de Lin Stabilisée ROB ex Robbe) were charged into a reactor which was then flushed with nitrogen to maintain a nitrogen atmosphere therein. The linseed oil was heated to a temperature of 180–200° C. before adding 600 g of a maleic modified rosin ester hard resin having an acid value of 190–205 mg KOH/g (Krumbhaar K1614 ex Lawter). The reaction mixture was then heated to 250° C. and maintained at this temperature for 2 hours before adding 180 g of coconut fatty acid methyl ester (Estisol 312 ex Esti Chem A/S). On cooling to 110° C., 27 g of a gelling agent in mineral oil (40% by weight of Additol VXL 12 ex Hoechst in Scriptane 280 ex Haltermann) were added, and the mixture re-heated to 180° C. and maintained at this temperature for 10 minutes. A further 30 g of Estisol 312 were added to adjust the viscosity. Samples were taken and showed the following characteristics:

Viscosity - 539 poise

Tack - 262

Heptane tolerance - 56 ml

Acid value - 73 mg KOH/g (theoretical acid value 81 mg KOH/g).

The resulting mixture was filtered through a 50 micron filter to give Varnish XII.

In the inks of Examples 20–27, all formulations are shown as 100 part formulations by weight. Where the figures in any example total more or less than 100, they should be factored proportionately to 100.

EXAMPLE 20

Yellow ink based on Varnishes IV and VI

A procedure similar to that of Example 5 was followed. The initial mixture consisted of:

| | |
|---|---|
| Varnish IV | 54.8 |
| Yellow pigment | 13.0 |
| Alkyd resin (Hydrokyd 9 ex Lawter) | 2.0 |
| Antioxidant paste (HP5025 ex SPCI) | 0.5 |

These components were ground on a three-roll mill and then mixed with:

| | |
|---|---|
| Varnish VI | 15.0 |
| Orange colourant | 0.5 |
| Polyethylene wax | 7.0 |
| Anti-set-off paste | 4.0 |
| Litho additive (Optilith 4 ex Lawter) | 1.0 |
| Drier | 1.2 |
| Tall oil fatty acid ester (Nirez 9012 ex Arizona) | 3.0 |

This yellow ink had a viscosity of 310 poise and tack of 200. [Its varnish to pigment ratio is 5.4:1, and the ratio of acid functional hard resin to oil/alkyd is 1.24:1]

EXAMPLE 21

Black ink based on Varnishes IV and VI

A procedure similar to that of Example 5 was followed. The initial mixture consisted of:

| | |
|---|---|
| Varnish IV | 40.3 |
| Printex 45 (ex Degussa) | 18.0 |
| Alkyd (Hydrokyd 9 ex Lawter) | 5.0 |
| Antioxidant paste (HP5025 ex SPCI) | 0.7 |

These components were ground on a three-roll mill and then mixed with:

| | |
|---|---|
| Varnish VI | 12.0 |
| Bleu Alcali 61SR1118 | 6.0 |
| Polyethylene wax | 6.0 |
| Anti-set-off paste | 4.0 |
| Litho additive (Optilith 4 ex Lawter) | 1.0 |
| Drier | 3.0 |
| Tall oil fatty acid ester (Nirez 9012 ex Arizona) | 6.0 |

This black ink had a viscosity of 315 poise and tack of 154.

EXAMPLE 22

Cyan ink based on Varnishes IV and VI

A procedure similar to that of Example 5 was followed. The initial mixture consisted of:

| | |
|---|---|
| Varnish IV | 51.0 |
| Phthalocyanine blue pigment | 16.0 |
| Alkyd (Hydrokyd 9 ex Lawter) | 4.0 |
| Antioxidant paste (HP5025 ex SPCI) | 0.5 |

These components were ground on a three-roll mill and then mixed with:

| | |
|---|---|
| Varnish VI | 12.3 |
| Polyethylene wax | 6.0 |
| Anti-set-off paste | 4.0 |
| Litho additive (Optilith 4 ex Lawter) | 1.0 |
| Drier | 1.2 |
| Tall oil fatty acid ester (Nirez 9012 ex Arizona) | 4.0 |

This cyan ink had a viscosity of 350 poise and tack of 185.

EXAMPLE 23

Magenta ink based on Varnishes IV and VI

A procedure similar to that of Example 5 was followed. The initial mixture consisted of:

| | |
|---|---|
| Varnish IV | 48.0 |
| Red pigment | 18.0 |
| Alkyd (Hydrokyd 9 ex Lawter) | 5.0 |
| Antioxidant paste (HP5025 ex SPCI) | 0.5 |

These components were ground on a three-roll mill and then mixed with:

| | |
|---|---|
| Varnish VI | 12.3 |
| Polyethylene wax | 6.0 |
| Anti-set-off paste | 4.0 |
| Litho additive (Optilith 4 ex Lawter) | 1.0 |
| Drier | 1.2 |
| Tall oil fatty acid ester (Nirez 9012 ex Arizona) | 4.0 |

This magenta ink had a viscosity of 410 poise and tack of 180.

EXAMPLE 24

Yellow ink based on Varnishes III and VII

A procedure similar to that of Example 5 was followed. The initial mixture consisted of:

| | |
|---|---|
| Varnish III | 11.0 |
| Yellow pigment | 13.0 |
| Alkyd (Hydrokyd 9 ex Lawter) | 3.2 |
| Antioxidant paste (HP5025 ex SPCI) | 0.5 |
| Varnish VII | 28.0 |

These components were ground on a three-roll mill and then mixed with:

| | |
|---|---|
| Varnish VII | 31.8 |
| Orange colourant | 0.5 |
| Polyethylene wax | 5.0 |
| Anti-set-off paste | 3.0 |
| Litho additive (Optilith 4 ex Lawter) | 1.0 |
| Drier | 1.5 |
| Estisol 312 ex Esti Chem A/S to adjust viscosity. | |

This yellow ink had a viscosity of 250 poise and tack of 213. [It has a ratio of acid functional hard resin to oil/alkyd of 1.57:1]

EXAMPLE 25

Black ink based on Varnishes III and VII

A procedure similar to that of Example 5 was followed. The initial mixture consisted of:

| | |
|---|---|
| Varnish III | 12.0 |
| Carbon black (Printex 45 ex Degussa) | 18.0 |
| Alkyd (Hydrokyd ex Lawter) | 6.6 |
| Antioxidant paste (HP5025 ex SPCI) | 0.5 |
| Varnish VII | 28.0 |
| Alkali Blue | 8.0 |

These components were ground on a three-roll mill and then mixed with:

| | |
|---|---|
| Varnish VII | 15.6 |
| Polyethylene wax | 5.0 |
| Anti-set-off paste | 2.5 |
| Litho additive (Optilith 4 ex Lawter) | 1.0 |
| Drier | 1.8 |
| Estisol 312 ex Esti Chem A/S to adjust viscosity. | |

This black ink had a viscosity of 280 poise and tack of 177.

EXAMPLE 26

Cyan ink based on Varnishes III and VII

A procedure similar to that of Example 5 was followed. The initial mixture consisted of:

| | |
|---|---|
| Varnish III | 12.0 |
| Phthalocyanine blue pigment | 16.0 |
| Alkyd (Hydrokyd 9 ex Lawter) | 6.1 |
| Antioxidant paste (HP5025 ex SPCI) | 0.5 |
| Varnish VII | 31.5 |

These components were ground on a three-roll mill and then mixed with:

| | |
|---|---|
| Varnish VII | 20.9 |
| Polyethylene wax | 5.0 |
| Anti-set-off paste | 3.0 |
| Litho additive (Optilith 4 ex Lawter) | 1.0 |
| Drier | 1.5 |
| Estisol 312 ex Esti Chem A/S to adjust viscosity. | |

This cyan ink had a viscosity of 215 poise and tack of 190.

EXAMPLE 27

Magenta ink based on Varnishes III and VII

A procedure similar to that of Example 5 was followed. The initial mixture consisted of:

| | |
|---|---|
| Varnish III | 13.0 |
| Red pigment | 18.0 |
| Alkyd (Hydrokyd 9 ex Lawter) | 7.3 |
| Antioxidant paste (HP5025 ex SPCI) | 0.4 |
| Varnish VII | 29.0 |

These components were ground on a three-roll mill and then mixed with:

| | |
|---|---|
| Varnish VII | 20.3 |
| Polyethylene wax | 5.0 |
| Anti-set-off paste | 3.0 |
| Litho additive (Optilith 4 ex Lawter) | 1.0 |
| Drier | 1.6 |
| Estisol 312 ex Esti Chem A/S to adjust viscosity. | |

This magenta ink had a viscosity of 215 poise and tack of 190.

EXAMPLE 28

Tests of ink performance and water washability

The inks of Examples 20–27 were tested for ink performance and water washability as in Examples 9 and 10. For all the inks, offset behaviour on the press, lithographic performance, setting time and print quality were good. All the inks were readily cleaned up from the rollers, blankets and plates using the water-based wash solutions of Examples 9 and 10.

I claim:

1. A lithographic printing ink comprising an alkali-soluble or dispersible binder material which is the reaction product of an acid functional hard resin with a fatty ester oil and/or an alkyd resin, wherein the acid functional hard resin has an acid value of at least 50 mgKOH/g and a weight ratio of the acid functional hard resin to oil plus alkyd resin is from 4:1 to 0.5:1.

2. The printing ink as claimed in claim 1, in which the said reaction product has an acid value of from 40 to 200 mgKOH/g.

3. The printing ink as claimed in claim 1, which ink further comprises a solvent and/or diluent selected from the group consisting of a fatty ester oil, mineral oil and petroleum distillate and mixtures thereof.

4. The printing ink as claimed in claim 1 also containing one or more other resinous components.

5. The printing ink as claimed in claim 1, which ink comprises a varnish which contains from 20 to 100% by weight of acid functional reaction product; from 0 to 25% by weight of other resinous binder component(s); and from 10 to 60% by weight of solvent/diluent.

6. The printing ink as claimed in claim 5, comprising a pigment in an amount such that the weight of the varnish to pigment is from 20:1 to 0.5:1.

7. A method of printing onto a substrate, the method comprising a step of depositing by lithography, an ink according to claim 1, onto the substrate.

* * * * *